US012299322B1

(12) United States Patent
Bianco (10) Patent No.: US 12,299,322 B1
(45) Date of Patent: *May 13, 2025

(54) ELASTIC BUFFER FOR MEDIA MANAGEMENT OF A MEMORY SUB-SYSTEM

(71) Applicant: Micron Technology, Inc., Boise, ID (US)

(72) Inventor: Antonio David Bianco, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 61 days.

This patent is subject to a terminal disclaimer.

(21) Appl. No.: 17/974,410

(22) Filed: Oct. 26, 2022

Related U.S. Application Data (63) Continuation of application No. 16/721,712, filed on Dec. 19, 2019, now Pat. No. 11,526,299.

(51) Int. Cl.
*G06F 3/06* (2006.01)
(52) U.S. Cl.
CPC .......... *G06F 3/0656* (2013.01); *G06F 3/0604* (2013.01); *G06F 3/0659* (2013.01); *G06F 3/0673* (2013.01)
(58) Field of Classification Search
CPC .... G06F 3/0656; G06F 3/0604; G06F 3/0659; G06F 3/0673
See application file for complete search history.

(56) References Cited

U.S. PATENT DOCUMENTS

| 3,366,945 | A  | * | 1/1968 | Bowman  | A63B 71/06 |
|           |    |   |        |         | 340/815.4  |
| 5,488,701 | A  | * | 1/1996 | Brady   | G11C 29/74 |
|           |    |   |        |         | 714/6.24   |
| 9,558,112 | B1 | * | 1/2017 | Borchers | G06F 12/0253 |
| 9,575,759 | B2 | * | 2/2017 | Cho     | G06F 12/0638 |
| 10,339,046 | B1 | * | 7/2019 | Hsieh  | G06F 3/0659 |

(Continued)

FOREIGN PATENT DOCUMENTS

| CN | 108874701 A | 11/2018 |
| CN | 109800183 A | 5/2019 |

OTHER PUBLICATIONS

J. Lee, Y. Kim, G. M. Shipman, S. Oral, F. Wang and J. Kim, "A semi-preemptive garbage collector for solid state drives," (IEEE ISPASS) IEEE International Symposium on Performance Analysis of Systems and Software, Austin, TX, USA, 2011, pp. 12-21, doi: 10.1109/ISPASS.2011.5762711. (Year: 2011).*

(Continued)

*Primary Examiner* — Masud K Khan
(74) *Attorney, Agent, or Firm* — Holland & Hart LLP (57) ABSTRACT

Methods, systems, and devices for an elastic buffer for a media management operation are described. A plurality of entries associated with a media management operation for a memory sub-system are stored. A first set of one or more write commands associated with the media management operation are buffered using the plurality of entries based on a second set of one or more write commands associated with a host write procedure. The first set of one or more write commands associated with the media management operation are issued based on the plurality of entries and a completion of the second set of one or more write commands associated with the host write procedure.

19 Claims, 5 Drawing Sheets

(56) References Cited

U.S. PATENT DOCUMENTS

| | | | | |
|---|---|---|---|---|
| 2005/0223194 | A1* | 10/2005 | Tremblay | G06F 9/30061 |
| | | | | 712/E9.05 |
| 2011/0252075 | A1* | 10/2011 | Ylonen | G06F 9/522 |
| | | | | 707/E17.007 |
| 2012/0278530 | A1* | 11/2012 | Ebsen | G06F 13/1684 |
| | | | | 711/E12.008 |
| 2017/0075823 | A1* | 3/2017 | Ward | G06F 12/1416 |
| 2017/0371584 | A1* | 12/2017 | Hsieh | G06F 3/0652 |
| 2018/0088810 | A1* | 3/2018 | Ramalingam | G06F 3/0659 |
| 2019/0087332 | A1* | 3/2019 | Jun | G06F 3/0611 |
| 2019/0147923 | A1 | 5/2019 | Pawlowski | |
| 2019/0354475 | A1* | 11/2019 | Choi | G06F 12/0238 |
| 2020/0117534 | A1* | 4/2020 | Yurzola | G06F 3/0619 |
| 2021/0191646 | A1* | 6/2021 | Bianco | G06F 3/0656 |

OTHER PUBLICATIONS

Liu, Ming Gang. BlueFlash: a reconfigurable flash controller for BlueDBM. Diss. Massachusetts Institute of Technology. (Year: 2014).

Chinese patent office, "China Office Action," issued in connection with China Patent Application No. 202011487210.X dated Nov. 11, 2023 (14 pages) (6 pages of English Translation and 8 pages of Original Document).

* cited by examiner

ELASTIC BUFFER FOR MEDIA MANAGEMENT OF A MEMORY SUB-SYSTEM

CROSS REFERENCE

The present Application for Patent is a continuation of U.S. patent application Ser. No. 16/721,712 by Bianco, entitled "ELASTIC BUFFER FOR MEDIA MANAGEMENT OF A MEMORY SUB-SYSTEM", filed Dec. 19, 2019, which is assigned to the assignee hereof, and which is expressly incorporated by reference in its entirety herein.

TECHNICAL FIELD

The following relates generally to a memory sub-system and more specifically to an for media management for a memory sub-system.

BACKGROUND

A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The disclosure will be understood more fully from the detailed description given below and from the accompanying drawings of various examples of the disclosure. The drawings, however, should not be taken to limit the disclosure to the specific examples, but are for explanation and understanding only.

DETAILED DESCRIPTION

Aspects of the present disclosure are directed to an elastic buffer media management for a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory devices that store data. The host system can provide data to be stored at the memory sub-system and can request data to be retrieved from the memory sub-system.

Data operations can be performed by the memory sub-system. The data operations can be host-initiated operations. For example, the host system can initiate a data operation (e.g., write, read, erase, etc.) on a memory sub-system. The host system can send access requests (e.g., write command, read command) to the memory sub-system, such as to store data on a memory device at the memory sub-system and to read data from the memory device on the memory sub-system.

The data operations can be media management related operations that are initiated by the memory sub-system. A memory sub-system controller can perform operations for media management algorithms, such as wear leveling, refresh, garbage collection, scrub, etc. The memory sub-system can initiate media management operations, that can include executing, for example a write operation, on data that is stored on a memory device.

A memory device can be a non-volatile memory device. A non-volatile memory device is a package of one or more dice. Each die can consist of one or more planes. For some types of non-volatile memory devices (e.g., negative-and (NAND) devices), each plane consists of a set of physical blocks. Each block consists of a set of pages. Each page consists of a set of memory cells, which store bits of data. For some memory devices, such as NAND devices, blocks are the smallest area than can be erased and pages within the blocks cannot be erased individually. For such devices, erase operations are performed one block at a time. A page of a block can contain valid data, invalid data, or no data. Invalid data is data that is marked as outdated as a new version of the data is stored on the memory device. Invalid data includes data that was previously written but is no longer associated with a valid logical address, such as a logical address referenced by a host system in a physical to logical (P2L) mapping table. Valid data is the most recent version of such data being stored on the memory device. A memory sub-system can mark data as invalid based on information received, for example, from an operating system. A page that does not contain data includes a page that has been previously erased, and not yet written to.

A memory sub-system controller can perform operations for media management algorithms, such as wear leveling, refresh, garbage collection, scrub, etc. A block may have some pages containing valid data and some pages containing invalid data. To avoid waiting for all of the pages in the block to have invalid data in order to erase and reuse the block, an algorithm hereinafter referred to as "garbage collection" can be invoked to allow the block to be erased and released as a free block for subsequent write operations. Garbage collection is a set of media management operations that include, for example, selecting a block that contains valid and invalid data, selecting pages in the block that contain valid data, copying the valid data to new locations (e.g., free pages in another block), marking the data in the previously selected pages as invalid, and erasing the selected block.

"Garbage collection" hereinafter refers to selecting a block, rewriting the valid data from the selected block to another block, and erasing all invalid data and valid data stored at the selected block. The valid data from multiple selected blocks can be copied to a smaller number of other blocks and the selected blocks can then be erased. As a result, the number of blocks that have been erased can be increased such that more blocks are available to store subsequent data from a host system.

During garbage collection, valid data of the block to be erased is initially read into and stored by a buffer based on one or more read commands issued by a memory sub-system controller and the corresponding page (e.g., the page on which the valid data is contained) is erased. The valid data can then be written (e.g., re-written) to the memory sub-system (e.g., to a different page of the memory device). In order to write the valid data to a location (e.g., a different page of the memory device), write commands are issued by the memory controller, each write command indicating a memory address (e.g., a destination memory address) to which the valid data is to be written.

In some garbage collection procedures, the write commands are issued once the corresponding read command has been completed. The read commands are issued in a given order (e.g., a first, sequential order), but in some cases, the read commands are not completed in the same order. As write commands are issued once a corresponding read command is complete, the write commands are not issued in the same order in which the read commands were issued (i.e., the write commands are issued in a non-sequential manner with respect to the order of the issued read commands). Such writing techniques (e.g., writing valid data back to a block in a non-sequential manner during a garbage collection procedure) can result in the memory sub-system experiencing a performance loss as blocks of data are written to pages out of order, which may increase the latency for future read operations to be performed on the blocks of data.

Aspects of the present disclosure address these and other issues through the use of a scoreboard data structure that provides an elastic buffer during a garbage collection procedure. An elastic buffer may allow for a delay in the issuance of a write command (or multiple write commands) for a garbage collection procedure that are associated with out-of-order read commands. For example, when pages of valid data are read from a block during a garbage collection procedure, the scoreboard can store entries related to a sequence of read operations for the garbage collection procedure, and use these entries to maintain (e.g., track) the order in which pages are read. Accordingly, after the block has been erased, the pages of valid data can be written (e.g., re-written) to a new location in the same order in which the pages are read (e.g., in sequential order). That is, write commands for the pages of valid data can be issued to in a same order as the read commands were issued, which can result in the storage of the data to the new location in a same order as they were originally stored. Additionally or alternatively, the scoreboard may act as a buffer to delay the issuance of the write commands associated with the garbage collection procedure. While the commands are delayed, the system may perform write operations (e.g., host write operations) that are not associated with the garbage collection procedure. That is, delaying the garbage collection write commands may allow for the system to utilize available bandwidth to process other commands or operations. This can result in the memory sub-system having improved read, write, and erase speeds, reduced power consumption, improved processing times, and the like.

Figure 1:
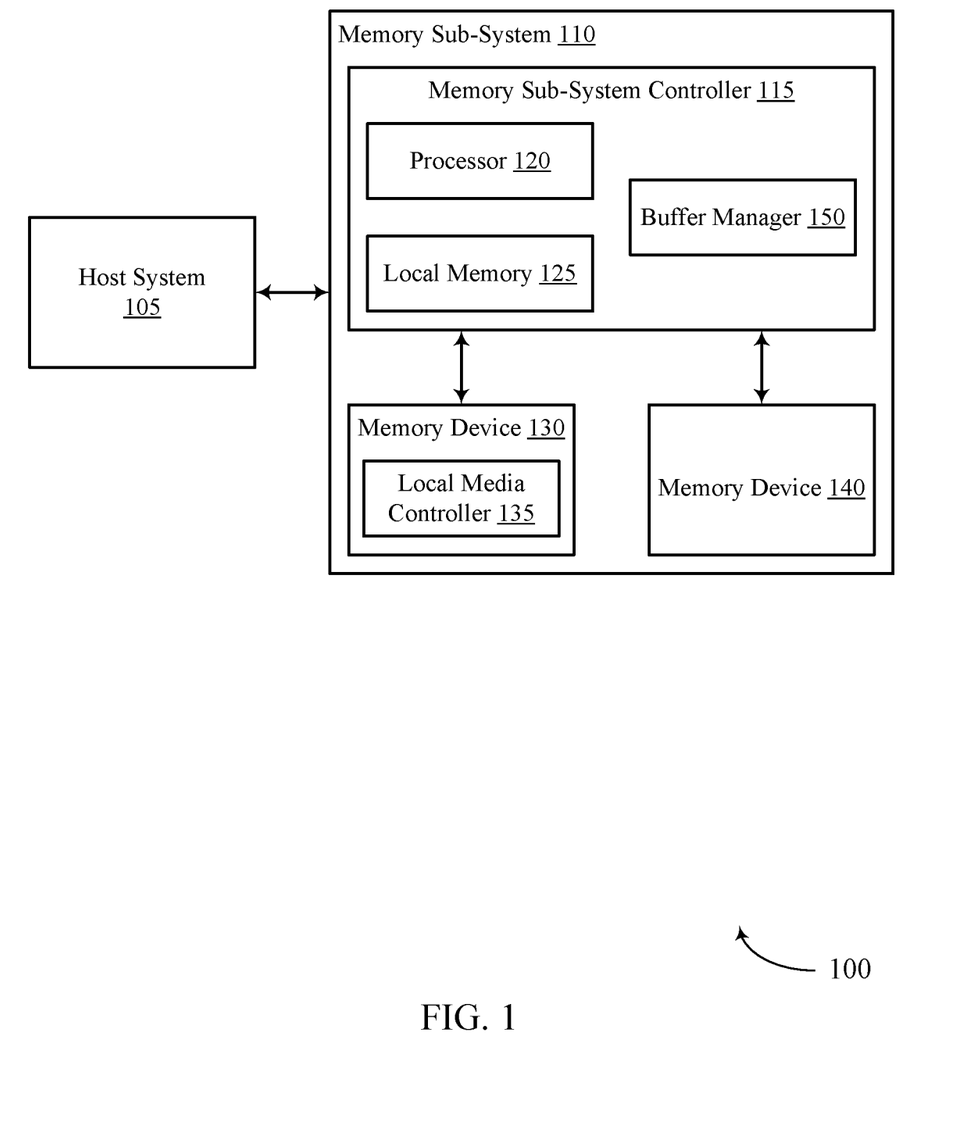
FIG. 1 illustrates an example computing system that includes a memory sub-system in accordance with some examples of the present disclosure.

FIG. 1 illustrates an example computing system 100 that includes a memory sub-system 110 in accordance with some embodiments of the present disclosure. The computing environment can include a host system 105 and a memory sub-system 110. The memory sub-system 110 can include media, such as one or more non-volatile memory devices (e.g., memory device 130), one or more volatile memory devices (e.g., memory device 140), or a combination thereof.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and a non-volatile DIMM (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 105 that is coupled with one or more memory sub-systems 110. In some examples, the host system 105 is coupled with different types of memory sub-systems 110. FIG. 1 illustrates one example of a host system 105 coupled with one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 105 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 105 uses the memory sub-system 110, for example, to write data to the memory sub-system 110 and read data from the memory sub-system 110.

The host system 105 can be coupled to the memory sub-system 110 using a physical host interface. Examples of a physical host interface include, but are not limited to, a serial advanced technology attachment (SATA) interface, a peripheral component interconnect express (PCIe) interface, universal serial bus (USB) interface, Fiber Channel, Small Computer System Interface (SCSI), Serial Attached SCSI (SAS), dual in-line memory module (DIMM) interface (e.g., DIMM socket interface that supports Double Data Rate (DDR)), etc. The physical host interface can be used to transmit data between the host system 105 and the memory sub-system 110. The host system 105 can further utilize a non-volatile memory Express (NVMe) interface to access the memory components (e.g., memory devices 130) when the memory sub-system 110 is coupled with the host system 105 by the PCIe interface. The physical host interface can provide an interface for passing control, address, data, and other signals between the memory sub-system 110 and the host system 105.

The memory devices can include any combination of the different types of non-volatile memory devices and/or volatile memory devices. The volatile memory devices (e.g., memory device 140) can be, but are not limited to, random access memory (RAM), such as dynamic RAM (DRAM) and synchronous DRAM (SDRAM).

Some examples of non-volatile memory devices (e.g., memory device 130) includes a NAND type flash memory. Another example of non-volatile memory device is write-in-place memory, such as three-dimensional cross-point ("3D cross-point") memory. A cross-point array of non-volatile memory can perform bit storage based on a change of bulk resistance, in conjunction with a stackable crossgridded data access array. Additionally, in contrast to many flash-based memories, cross-point non-volatile memory can perform a write in-place operation, where a non-volatile memory cell can be programmed without the non-volatile memory cell being previously erased.

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory devices such as NAND type flash memory are described, the memory device 130 can be based on any other type of non-volatile memory, such as read-only memory (ROM), phase change memory (PCM), self-selecting memory, other chalcogenide based memories, ferroelectric RAM (FeRAM), magneto RAM (MRAM), negative-or (NOR) flash memory, electrically erasable programmable ROM (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), a digital signal processor (DSP)), or other suitable processor.

The memory sub-system controller 115 can include a processor 120 (e.g., a processing device) configured to execute instructions stored in a local memory 125. In the illustrated example, the local memory 125 of the memory sub-system controller 115 includes an embedded memory configured to store instructions for performing various processes, operations, logic flows, and routines that control operation of the memory sub-system 110, including handling communications between the memory sub-system 110 and the host system 105.

In some examples, the local memory 125 can include memory registers storing memory pointers, fetched data, etc. The local memory 125 can also include read-only memory (ROM) for storing micro-code. While the example memory sub-system 110 in FIG. 1 has been illustrated as including the memory sub-system controller 115, in another example of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 105 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 105 via the physical host interface. The host interface circuitry can convert the commands received from the host system into command instructions to access the memory devices 130 as well as convert responses associated with the memory devices 130 into information for the host system 105.

The memory sub-system 110 can also include additional circuitry or components that are not illustrated. In some examples, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some examples, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes a buffer manager 150 that can buffer one or more write commands for a media management operation. In some examples, the buffer manager 150 may utilize one or more scoreboard entries of a scoreboard for buffering the write commands. As discussed herein, one or more components may be configured to perform a media management operation using the buffer manager 150 to delay (e.g., buffer) one or more write commands associated with a media management operation. While the write commands are delayed, one or more other write operations (e.g., host write operations) may be performed because there is additional bandwidth provided to the memory device due to the delay in issuing the media management write commands.

In some examples, the memory sub-system controller 115 includes at least a portion of the buffer manager 150. For example, the memory sub-system controller 115 can include a processor 120 (e.g., a processing device) configured to execute instructions stored in local memory 125 for performing the operations described herein. In some examples, the buffer manager 150 is part of the host system 105, an application, or an operating system.

Additionally or alternatively, the buffer manager 150 can delay the issuance of one or more write commands during a media management operation. When a write command is generated, it may or may not be able to be issued immediately. For example, the issuance of the write command may be delayed due to system resources being allocated (e.g., temporarily allocated) to other processes. Accordingly, when a write command is generated, the buffer manager 150 may provide the write command to a buffer until it is issued. Further details with regards to the operations of the buffer manager 150 are described below.

Figure 2:
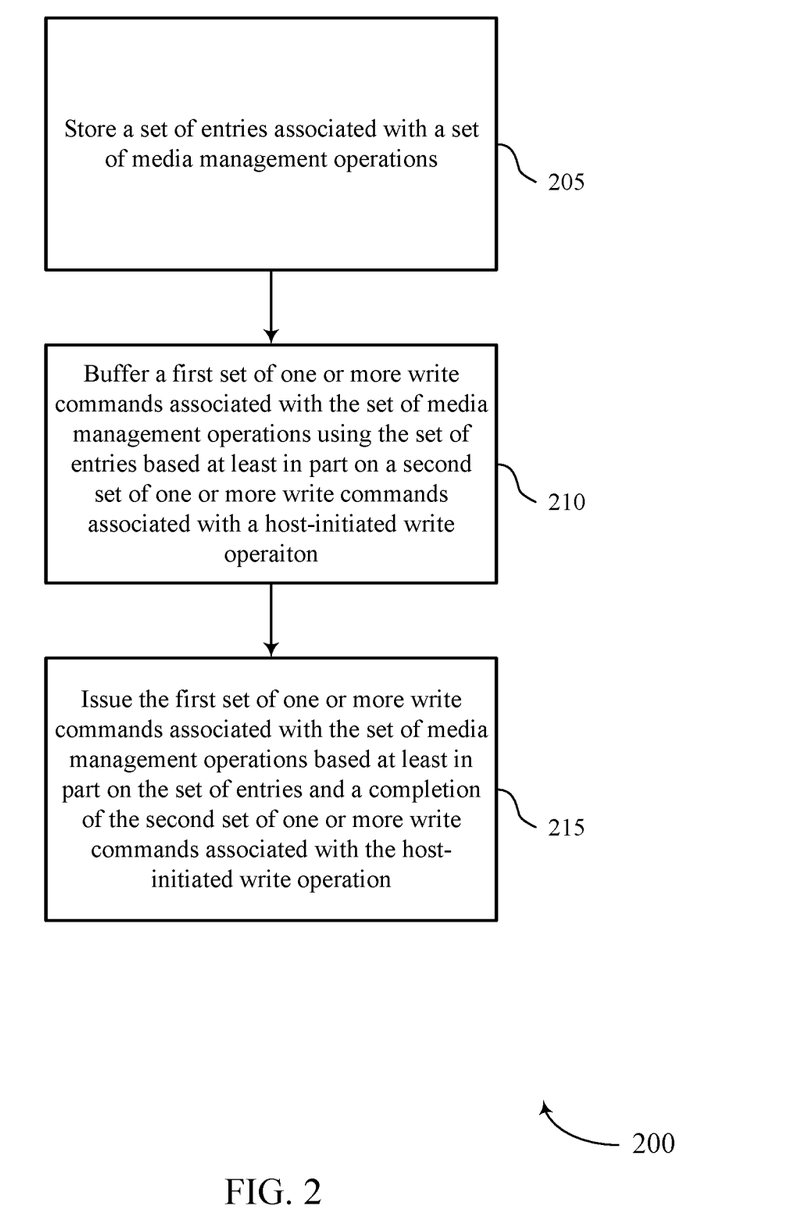
FIG. 2 is a flow diagram of an example method of media management using an elastic buffer in accordance with some examples of the present disclosure.

FIG. 2 is a flow diagram 200 of an example method of media management using an elastic buffer in accordance with some examples of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some examples, the method 200 is performed by the buffer manager 150 of FIG. 1. Although shown in a particular sequence or order, unless otherwise specified, the order of the operations can be modified. Thus, the illustrated examples should be understood only as examples, and the illustrated operations can be performed in a different order, and some operations can be performed in parallel. Additionally, one or more operations can be omitted in various examples. Thus, not all operations are required in every example. Other method flows are possible.

At operation 205, the processing device can store a set of entries associated with a set of media management operations for a memory sub-system. In some examples, each entry may include a current state of the set of media management operations with respect to a transfer unit (TU) of a set of TUs of the memory sub-system. In some examples, the method 200 can include issuing a first set of one or more read commands associated with the set of media management operations and receiving the first set of one or more read responses based at least in part on issuing the first set of one or more read commands.

At operation 210, the processing device can buffer a first set of one or more write commands associated with the set of media management operations using the set of entries based at least in part on a second set of one or more write commands associated with a host-initiated write operation. In some examples, the method 200 can include receiving a first set of one or more read responses associated with the set of media management operations and buffering the first set of one or more write commands based at least in part on the first set of one or more read responses. In some examples, the first set of one or more read responses may correspond to a subset of the set of entries. In some examples, the first set of read responses are received in consecutive order with respect to a read order implicit to the set of entries. In some examples, the method 200 can include storing the set of entries associated with the set of media management operations in a linked list or ring buffer at the memory sub-system and buffering the first set of one or more write commands using a subset of the set of entries in the linked list or ring buffer.

In some examples, the method 200 can include updating the current state of the set of media management operations for a subset of the set of entries based at least in part on the first set of one or more write commands associated with the set of media management operations. In some examples, the first set of one or more write commands may correspond to the subset of the set of entries.

At operation 215, the processing device can issue the first set of one or more write commands associated with the set of media management operations based at least in part on the set of entries and a completion of the second set of one or more write commands associated with the host-initiated write operation. In some examples, each of the first set of one or more read responses may correspond to a write command of the first set of one or more write commands. In some examples, the first set of one or more write commands correspond to consecutive entries of the set of entries.

Figure 3:
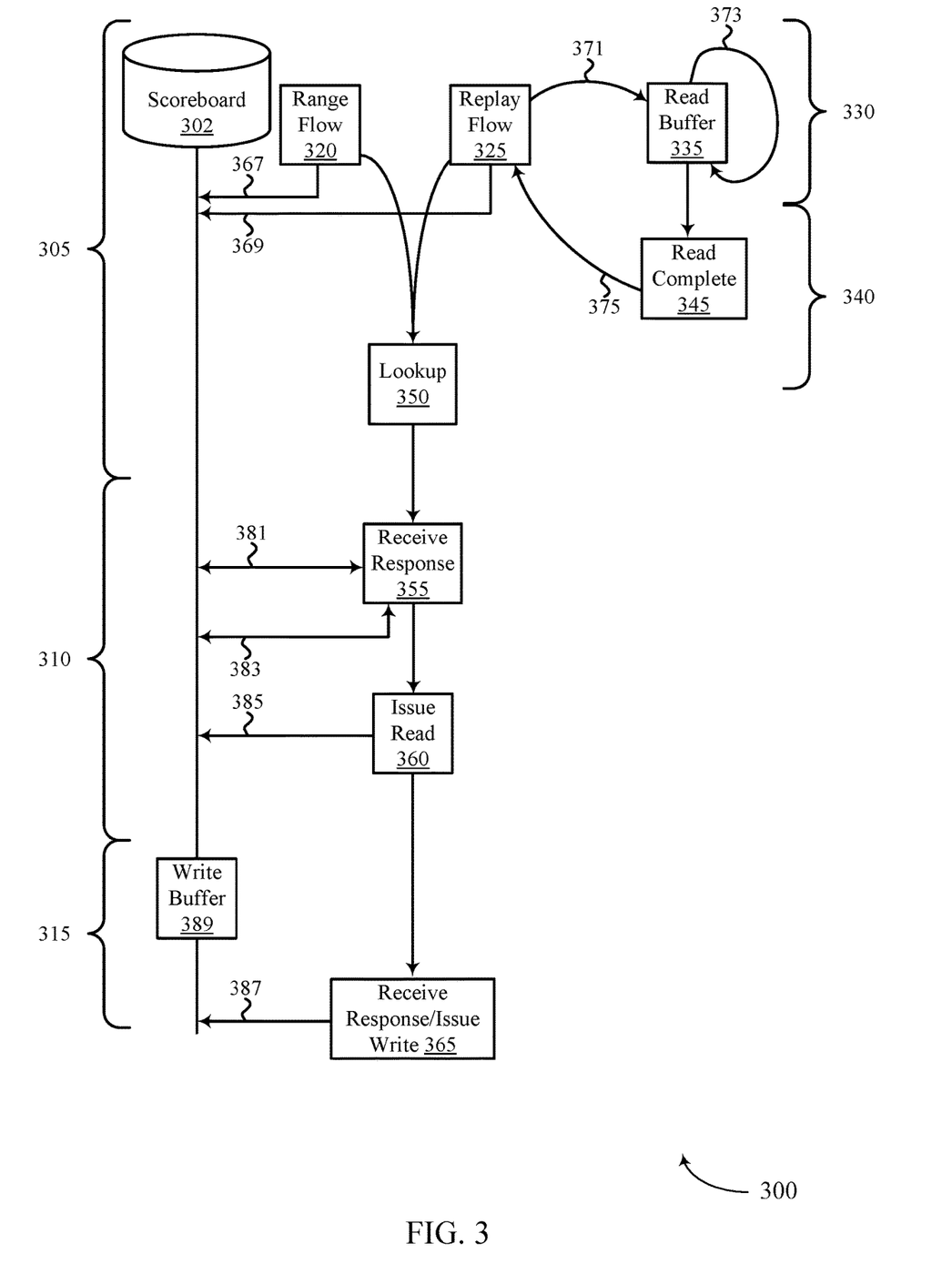
FIG. 3 is a block diagram of an example method for media management using an elastic buffer in accordance with some examples of the present disclosure.

FIG. 3 illustrates an example of a method diagram 300 for media management that uses an elastic buffer in accordance with examples as disclosed herein. The method diagram 300 illustrates stages for identifying valid data (e.g., at stage 305), reading valid data (e.g., at stage 310), and issuing a write command (e.g., at stage 315). Additionally or alternatively, the method diagram 300 illustrates the use of a write buffer 389 to buffer the write commands before issuance. In some examples, the operations performed as described with reference to FIG. 3 can be implemented at a memory sub-system and can utilize a scoreboard 302. In some examples, the scoreboard 302 may be used as a buffer or may include a buffer such as write buffer 389. Further, the operations can be performed according to the operations of a host system and/or local memory controller, and can be implemented based on a setting of a state machine. In some examples, the method diagram 300 can illustrate a range flow procedure 320 and a replay flow procedure 325.

The method diagram 300 can illustrate one or more operations for media management (e.g., media management operations for garbage collection). During a media management operation, data can be migrated (e.g., internally within a memory sub-system) from one location (e.g., from a source memory address) to another location (e.g., to a destination memory address) independent of any direct host interaction. Media management operations can be performed to pack valid data together, to free space for new writes, for error avoidance, for wear leveling, and/or to restore RAIN parity protection in the event of an error. Additionally or alternatively, media management operations can consist of moving or copying data from one or more source blocks (e.g., one or more blocks of NAND cells) into one or more destination blocks. In some examples, media management operations can result in data consolidation to free resources (e.g., NAND cells) for subsequent erase and new write processing.

In some examples, the block of data transferred during a media management operation can be or can be referred to as a transfer unit (TU) and can be the smallest size of data internally managed by a memory sub-system controller (e.g., by the processor 120 as described with reference to FIG. 1), local media controller, or by a host system (e.g., host system 105 of FIG. 1) and corresponds to a logical address (e.g., a TU address (TUA)) and a physical address (e.g., an abstracted physical address such as a flash logical address (FLA), which may relate to a physical address of the NAND cell referred to as a platform physical address (PPA)). In order to consolidate data and/or free resources for subsequent access operations, the TU can be written to a new location (e.g., a destination address), and the original block (e.g., the block from which the TU is moved) can be erased. Candidates (e.g., a blocks) for media management operations can be selected using a tree (a pool, a list, a queue, etc.). In some examples, the candidates can be maintained by the scoreboard 302. Based on the identification of valid TUs and the scoreboard 302 maintaining a tree, a sequential media management operation can be performed. As discussed herein, it can be beneficial to write TU units to a new location sequentially (e.g., in the same order that each TU is read) to improve performance of the memory sub-system.

In order to move (e.g., write) valid TUs to a destination block sequentially, the scoreboard 302 can be or can include a linked list. A linked list can be utilized by the scoreboard 302 due to its ability to maintain a sequence of entries. In other examples, the scoreboard 302 can be or can include any type of data structure that is able to maintain a sequence of entries (e.g., such as a circular buffer or a tree). Each linked list entry can include at least a TUA and an FLA associated with a TU. Additionally or alternatively, among other parameters that can be included in the linked list, the linked list can include a next node identifier. The next node identifier can indicate a subsequent TU for the media management operation. Accordingly, utilizing a list where each entry indicates a next (e.g., a subsequent) TU can allow for valid TUs to be written to a destination block sequentially.

In some examples, a tree can be maintained by the scoreboard 302. A tree can consist of a list (a queue, a pool, etc.) of TUs for a media management operation. For example, a read operation can occur and the TUA and/or FLA for each TU can be stored (e.g., sequentially) to the scoreboard 302 according to the order that the read commands were issued. The status of each TUA and/or FLA may be maintained in a list (e.g., a linked list) at the scoreboard 302. The order of the list (e.g., the order that read commands were issued) can allow for the TUs to be written to a destination block sequentially regardless of the order that responses to read commands (e.g., read responses) are received. In other examples, the order of the linked list can be calculated on the fly using a predictive algorithm (e.g., an algorithm to predict the order that the host can issue read commands).

At stage 305, one or more operations can be performed to identify valid data (e.g., TUs). Although a count of valid TUs in a block can be readily available (e.g., available to a controller), a location of each valid TU can be identified. In some examples a location of valid TUs can be identified using a range flow procedure 320 or a replay flow procedure 325. A range flow procedure 320 can include processing commands for performing a media management operation on an entire memory sub-system. Additionally or alternatively, a replay flow procedure 325 can use a buffer (e.g., read buffer 335) and can cycle through physical locations in a block.

At stage 310, one or more operations can be performed to read valid data (e.g., TUs) that was identified at stage 305. For example, after valid TUs are identified, an FLA corresponding to each valid TU can be compared with the tree maintained by the scoreboard 302. If the FLA corresponding to a valid TU matches a FLA maintained by the scoreboard 302, then a read command associated with the valid TU can occur. Conversely, if the FLAs do not match, the entry maintained by the scoreboard 302 can be released (e.g., moved to the end of the linked list). In other examples, if the FLAs do not match, the system can be configured to continue cycling through valid TUs until an FLA matches the entry maintained by the scoreboard 302.

At stage 315, one or more operations can be performed to write valid data (e.g., TUs) that were read at stage 310. As discussed herein, when an FLA corresponding to a valid TU matches a FLA maintained by the scoreboard 102, a read command associated with the valid TU is issued. Additionally or alternatively, based on the read command being issued, data associated with the valid TU can be written (e.g., moved) into a destination block (e.g., to a destination address). Due to the use of a linked list, data associated with valid TUs can be written to a destination block sequentially.

At stage 305, various methods can be employed to determine valid data (e.g., valid TUs). For example, a replay flow procedure 325 can support the determination of valid data by iterating through various TUs stored within a buffer (e.g., within a read buffer 335). The buffer can include one or more addresses (e.g., TUAs and/or FLAs) that correspond to locations in a block from which a respective TU was read. In some examples, a replay flow procedure 325 can be selected based on one or more settings associated with a mode register and/or a controller (e.g., a memory sub-system controller, a local media controller). When the replay flow procedure 325 is employed, a signal 371 can be received by the read buffer 335 during the first stage 330. The signal 371 can initiate the read buffer 335 to cycle through one or more TUs (e.g., as illustrated by 373)). That is, the read buffer 335 can map (e.g., determine, identify, etc.) a TUA and an FLA of a potentially valid TU according to an order in which read commands are issued. During the second stage 340, the TUA and FLA of each TU can be identified and provided to the scoreboard 302 (e.g., via signal 375 and/or signal 369).

After identifying and providing the TUA and the FLA to the scoreboard the list (e.g., the linked list) can be compiled at the scoreboard 302. In some examples, a lookup of the TUA and FLA can then be issued (e.g., at 350) to determine whether the associated data remains valid, and to write (e.g., sequentially) the valid data to a destination block. In some examples, the lookup 350 can occur in an order that read responses are received, and can be performed to determine whether the TUA and FLA match an entry of the tree stored at the scoreboard 302.

A range flow procedure 320 can include processing commands that fold data (e.g., move and organize data) of an entire memory sub-system. For example, a range flow procedure 320 can be selected based on one or more settings associated with a mode register and/or a controller (e.g., memory sub-system controller, a local media controller). When a range flow procedure 320 is employed, a read command for each FLA in a particular block can be issued. A corresponding TUA and FLA can be stored to the scoreboard 302 as part of a list (e.g., a linked list). In some examples, a lookup of the TUA and FLA can then be issued (e.g., at 350) to determine whether the associated data remains valid, and to write (e.g., sequentially) the valid data to a destination block. Because the tree can utilize a linked list, the TUA and FLA identified can be compared with a first entry of the list (e.g., the head of the list). Depending on the results of the comparison, a read command can be issued and the TU can be written to a destination block.

In some examples, both a range flow procedure 320 and a replay flow procedure 325 can result in a lookup 350 being performed to determine whether a read response (e.g., a TUA and FLA corresponding to a read response) matches an entry of the tree stored at the scoreboard 302. Accordingly, the TUA and FLA associated with the read response can be provided to the scoreboard 302 via signal 381. The signal 381 can be transmitted to the scoreboard 302 by a controller or other component.

As read responses are received, a corresponding TUA and FLA can be compared with a first entry (e.g., the head of the list) of the tree stored at the scoreboard 302. In some instances, the TUA and FLA may not match the first entry. For example, the comparison of the first entry with the first received TUA and FLA can indicate that the entries do not match. In such an example, the first entry of the list can be released (e.g., moved to the bottom of the list). Accordingly, the TUA and FLA can be compared with a subsequent entry (or entries) in the list until a match is determined. Once a match is determined, a read of the associated TU can be issued (e.g., at 360), and the TU can be subsequently written to a destination block (e.g., at 365, which can occur at the stage 315). In some examples, the stage 310 and the stage 315 can be asynchronous (e.g., a duration can occur between the two stages).

In some examples, the write buffer 389 can be implemented to buffer (e.g., delay) the issuance of one or more write commands. When a write command is generated, it can or cannot be able to be issued immediately. For example, the issuance of the write command can be delayed due to system resources being allocated (e.g., temporarily allocated) to other processes. Accordingly, when a write command is generated, it can first be buffered until it is issued (e.g., at 365).

Multiple write commands can be stored to the write buffer 389 at any one time. For example, after a first write command (e.g., a first set of read commands) is provided to the write buffer 389, the process depicted in FIG. 3 can restart. That is, valid data can then be identified (e.g., at stage 305), the valid data can be read (e.g., at stage 310), and a write command can be generated and provided to the write buffer 389. Each write command that is generated can be placed in the write buffer 389 in the order that it is generated. For example, a first write command can be generated and provided to the write buffer 389, followed by a second write command. The write commands can be stored to the write buffer 389 such that the first write command can be issued first, followed by the second write command. As system resources become free such that write commands can be issued, the write commands can be issued from the write buffer 389 such that the corresponding TU is written to the destination block. When a TU is written to the destination block (e.g., when a write command is issued at 365) the associated entry in the scoreboard 302 can be released. Accordingly, such a process can result in TUs being written to a destination block in a same order as a read commands were issued and write commands saved to the write buffer 389, which can allow bandwidth for other operations (e.g., host write commands) by delaying the issuance of a write command for the media management operation.

Figure 4:
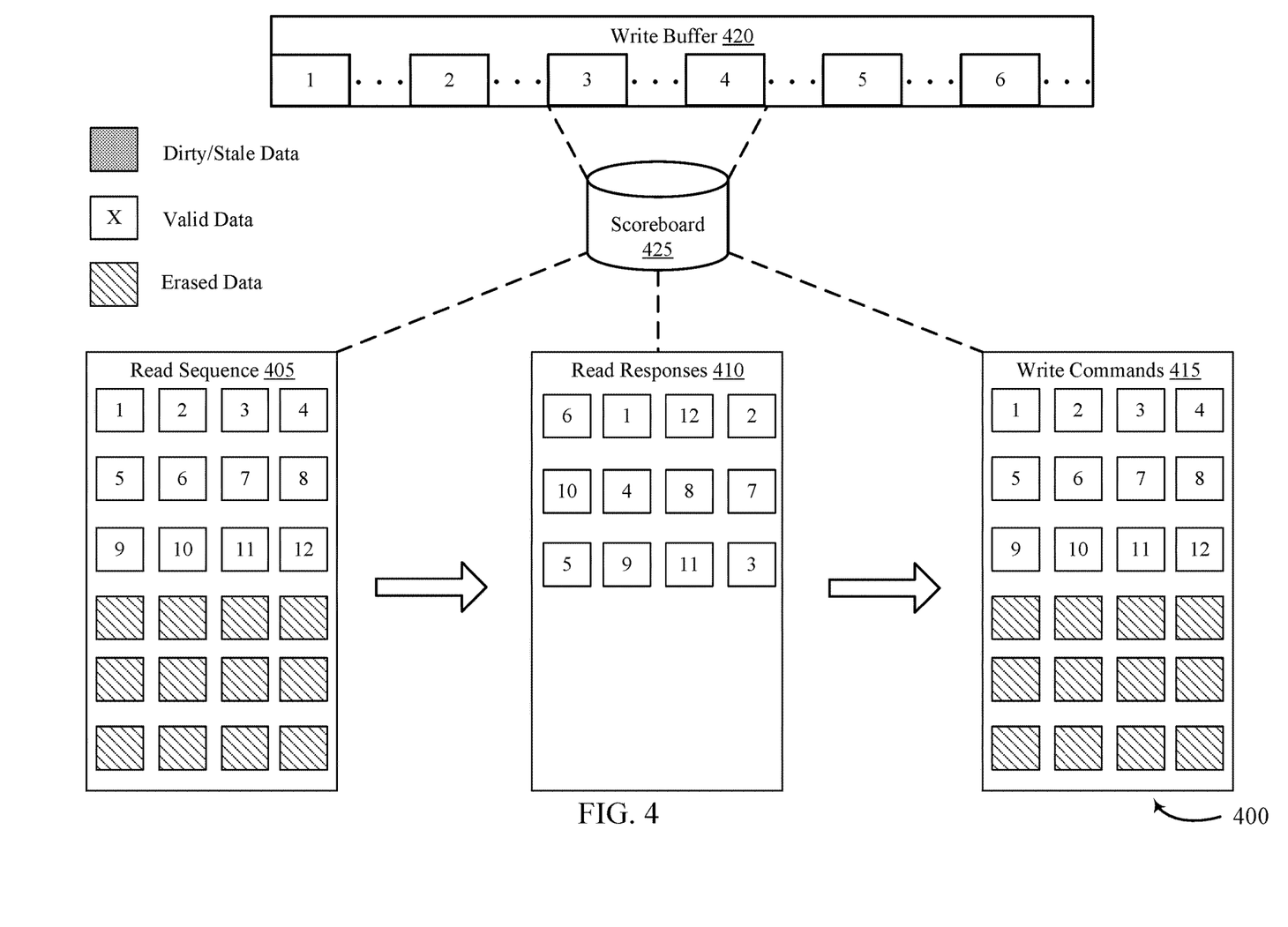
FIG. 4 is a diagram of an example elastic buffer for media management for a memory sub-system in accordance with some examples of the present disclosure.

FIG. 4 illustrates an example of a block diagram 400 of media management operations using an elastic buffer in accordance with examples as disclosed herein. The operations can illustrate a read sequence 405, a read response sequence 410, and a write command sequence 415. In some examples, the write command sequence 415 can be implemented by a write buffer 420, which can be an example of the write buffer 389 as described with reference to FIG. 3. Additionally or alternatively, the media management operation 400 can be implemented using a scoreboard 425, which can be an example of a scoreboard 302 as described with reference to FIG. 3. In some examples, the write buffer 420 can include one or more scoreboard entries that facilitate the media management operation and can be an example of the write buffer 389 of FIG. 3.

In some examples, FIG. 4 illustrates operations of a media management operation. As discussed herein, a media management operation can occur to migrate data from one location to another location independent of any direct host interaction. For example, valid data can be packed together to free space for new writes, for error avoidance, for wear leveling, and/or to restore RAIN parity protection in the event of an error. In the context of FIG. 4, each of the read sequence 405, the read responses 410, and the write commands 415 can be associated with a block (e.g., a block of data). Each block can include one or more pages capable of storing a finite amount of data. For example, each block can include 32 pages that are each capable of storing 4 kilobytes (KB) or 8 KB of data (or other amount of data). For illustrative purposes, each of the read sequence 405, the read responses 410, and the write commands 415 illustrate twelve (12) blocks of valid data (numbered 1 through 12) and various blocks of dirty/stale data and/or erased data. Dirty data is the latest version of data in cache memory that had not been saved to media (e.g., NAND). Stale data includes data that was previously written but is no longer associated with a valid logical address, such as a logical address referenced by a host system in a physical to logical (P2L) mapping table. Each block of valid data (e.g., 1 through 12) can include one or more TUs. For example, a block of valid data can include multiple pages (e.g., multiple 16 KB pages) and each page can include multiple TUs (e.g., multiple 4 KB TUs).

A range flow procedure (e.g., range flow procedure 320 as described with reference to FIG. 3) and/or a replay flow procedure (e.g., replay flow procedure 325 as described with reference to FIG. 3) can be associated with a read sequence 405. For example, a range flow procedure and/or a replay flow procedure can issue a one or more read commands for reading TUs. As shown in FIG. 4, and for illustrative purposes only, a read sequence 405 can issue one or more read commands for one or more TUs associated with blocks 1 through 12. The read sequence 405 can issue the read commands simultaneously, such that a read command for each subsequent TU is issued in order (i.e., a read command for each TU is issued consecutively). The read commands can be stored to the scoreboard 425 as a list (e.g., a linked list, a tree, a ring buffer). In some examples, a TUA and FLA associated with each TU can be stored as a scoreboard entry.

In some examples, the scoreboard entries can store a respective value associated with each TU. Accordingly, when an associated read response is received (i.e., a response associated with a TUA and FLA stored to the scoreboard 425), the respective value can be updated. Based on the value stored in the scoreboard entries, the TU can be written to a destination block in sequential order. A listing of some potential scoreboard states reflected by a scoreboard entries entry is illustrated below in Table 1. The states reflected in Table 1 can reflect a scoreboard entry at any one point in time.

TABLE 1

| Value | Meaning |
| --- | --- |
| 0 | Empty |
| 1 | Found TUA/FLA pair |
| 2 | Lookup request sent |
| 3 | Lookup response received |
| 4 | Buffer allocated |
| 5 | Read request sent |
| 6 | Read response received |
| 7 | Write request sent |

As shown in Table 1, the scoreboard 425 can include a variety of entries. Each of the pages (and blocks 1 through 12) can be associated with a respective entry. For example, some blocks (and TUs) can be associated with a same entry, and other blocks (and TUs) can be associated with a different entry. Each entry represents a current state of a respective block and/or TU.

In some examples, entry "0" represents an empty state. An empty state can indicate that the page is empty (e.g., it has been previously erased) and no valid data is to be read from the page and/or that the page is free to be written to. In some examples, entry "1" represents that a TUA and FLA have been identified. In some examples, entry "2" represents that a lookup has been performed on the TUA and FLA to determine if the associated data is still valid.

In some examples, entry "3" represents that a response regarding whether the data associated with the TUA and FLA is valid. If the data is valid, the entry remains on the scoreboard. If the data is invalid, the entry can be moved to the end of the linked list and assigned a "0". In some examples, entry "4" represents the valid data being allocated to the buffer (e.g., the read buffer 335 with reference to FIG. 3). In some examples, entry "5" represents that the valid data associated with the TUA and FLA has been read.

In some examples, entry "6" represents that the valid data associated with the TUA and FLA has been received. In some examples, entry "7" represents that the valid read data is to be written. After the data has been written, the entry can be assigned a "0" and can be moved to the end of the linked list. This can indicate that the data was successfully (and sequentially) written back.

After issuing a read sequence 405, read responses 410 can be received (e.g., by the scoreboard 425). For example, as shown in FIG. 4, each response can be separated by dirty/stale data. In other examples, each response can be received in a non-sequential order. In yet another example, each response can be received in a different order than the read sequence 405 was issued. Receiving the read response sequence 410 in a non-sequential order can be due to a variety of reasons, including but not limited to particular channels being temporarily utilized for different operations (e.g., for erase operations). If the read response sequence 410 are written to a destination block in the received order (i.e., the non-sequential order), an overall performance of the memory sub-system can be reduced. Accordingly, it can be beneficial to issue write command sequence 415 in a sequential order as shown in FIG. 4.

In order to issue the write command sequence 415, the scoreboard 425 can utilize a write buffer 420. In some examples, the write buffer 420 can be or can be referred to as a ring buffer 420 and can be implemented by the scoreboard 425. In some cases, the scoreboard 425 is or acts as the write buffer 420. After a read response is received, a write command can be generated to a corresponding TU can be written to the destination block. As discussed herein, when a write command is generated, it can or cannot be able to be issued immediately. For example, the issuance of the write command can be delayed due to system resources being allocated (e.g., temporarily allocated) to other processes. Accordingly, when a write command is generated, it can first be buffered using the write buffer 420. That is, when read responses 410 are received, the values of the read responses 410 for the corresponding blocks can be stored in the write buffer 420 prior to issuance of a write command. For example, the read responses 410 can be received and the scoreboard 425 can act as write buffer 420 and store the value of the read responses rather than issuing write commands for the received read responses 410 so as to free up system resources for other operations (e.g., host write operations). Once the other operations are complete, the scoreboard 425 can issue write commands for 415 for the media management operation as operations associated with the media management operation, in some cases, can be associated with a lower priority than host operations.

Multiple write commands can be delayed by (i.e., read responses can be stored at) the write buffer 420. For example, write commands 415 can be stored to the write buffer 420 and, at any one time, the write buffer can store up to twelve (12) write commands corresponding to the twelve (12) blocks of valid data (numbered 1 through 12) shown in FIG. 4, though the scoreboard 425 can be configured to store multiple read response values prior to issuing read commands 415. Each block of valid data (e.g., 1 through 12) can be or can include one or more TUs.

When a write command is generated, it can be stored at the write buffer 420 until it is issued. For example, a first write command (e.g., a first set of read commands) corresponding to a TU associated with block "1" is provided to the write buffer 420. At any time after the write command is provided to the write buffer 420, the command can be issued. Additionally or alternatively, subsequent write commands (e.g., corresponding to a TU associated with block "2" though block "12") can be generated and stored to the write buffer 420. That is, valid data can then be identified, read, and a corresponding write command can be generated and provided to the buffer. Each write command that is generated can be placed in the buffer in the order that it is generated. For example, a first write command can be generated and provided to the write buffer 420, followed by a second write command. The write commands can be stored to the write buffer 420 such that the first write command can be issued first, followed by the second write command and any subsequent write commands. As system resources become free such that write commands can be issued, the write commands can be issued from the write buffer 420 such that the corresponding TU is written to the destination block.

As shown in FIG. 4 herein, as read responses 410 are received, a corresponding TUA and FLA can be compared with a first entry (e.g., the head of the list) of the list stored at the scoreboard 425. For example, when read response "1" (i.e., the first valid TU) is received, it can be compared with the first entry of the read sequence 405 that is stored at the scoreboard 425. Because the entries (e.g., an associated TUA and FLA of the entries) match, the read response "1" can be first-written to the destination block. That is, a write command sequence 415 associated with the read response "1" can be first-issued. Alternatively, the scoreboard 425 can indicate that the write command is to be passed to the write buffer 420. In such an example, the entry associated with the TU associated with block "1" can be moved to the write buffer 420. Subsequently, the read response "2" can then be compared with the next stored entry—the TU associated with block "2" stored at the scoreboard 425. If these entries match, the read response "2" can moved to the write buffer 420. In some examples, multiple write commands can be stored to the write buffer 420 at any one time. This process can continue such that respective TUs are written to the destination block when the system has resources to issue the corresponding write command. By writing each TU to a destination block from the write buffer 420 can allow for a delay between receipt of a read response and issuance of a corresponding write command. The delay can free up system resources or bandwidth for other operations to be performed by the memory sub-system (e.g., host read operations), which can improve performance of the associated memory sub-system.

Figure 5:
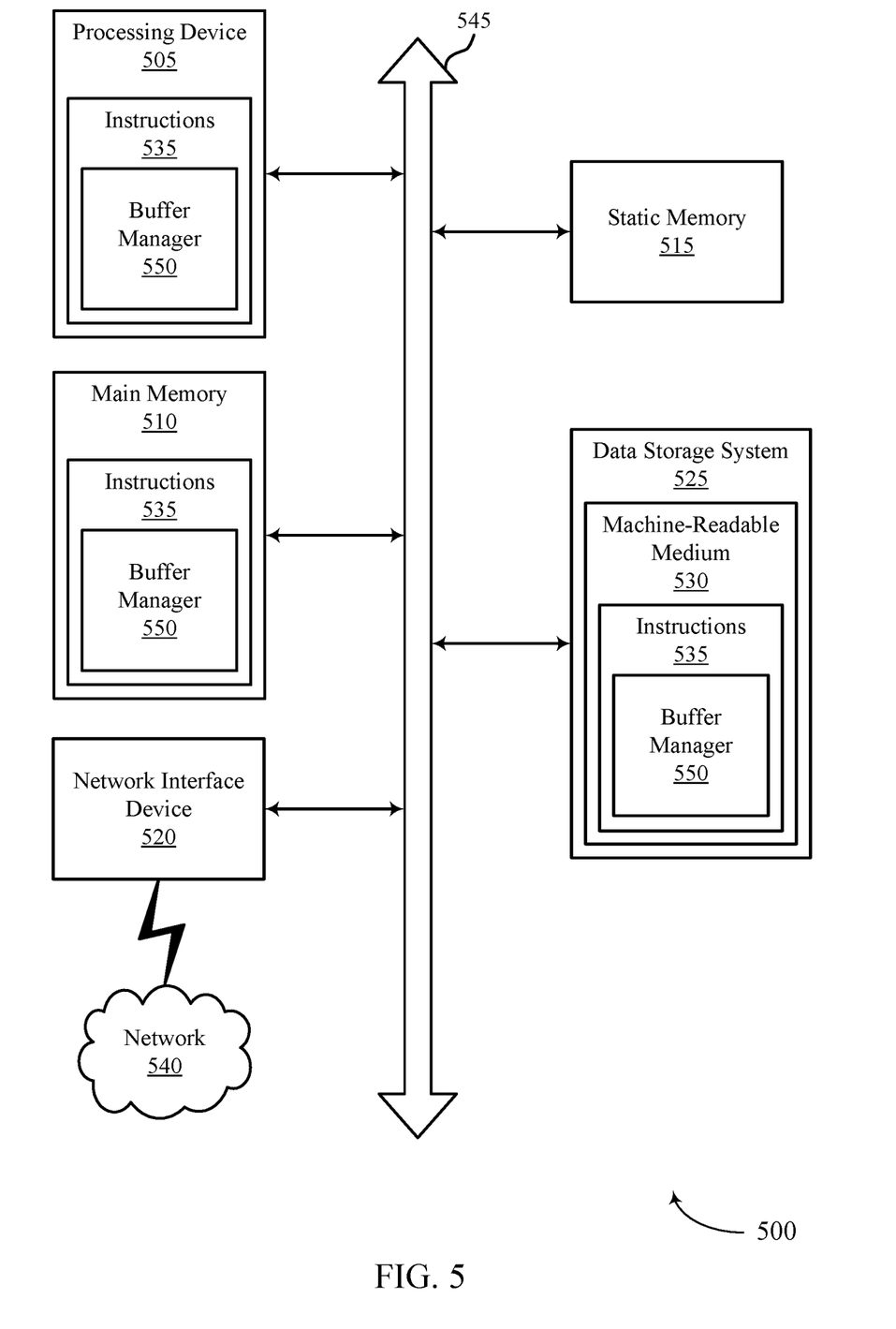
FIG. 5 is a block diagram of an example computer system in which examples of the present disclosure can operate.

FIG. 5 illustrates an example machine of a computer system 500 that supports an elastic buffer for media management for a memory sub-system in accordance with examples as disclosed herein. The computer system 500 can include a set of instructions, for causing the machine to perform any one or more of the techniques described herein. In some examples, the computer system 500 can correspond to a host system (e.g., the host system 105 described with reference to FIG. 1) that includes, is coupled with, or utilizes a memory sub-system (e.g., the memory sub-system 110 described with reference to FIG. 1) or can be used to perform the operations of a controller (e.g., to execute an operating system to perform operations corresponding to the buffer manager 150 described with reference to FIG. 1). In some examples, the machine can be connected (e.g., networked) with other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" can also include any collection of machines that individually or jointly execute a set (or multiple sets) of instructions to perform any one or more of the methodologies discussed herein.

The example computer system 500 can include a processing device 505, a main memory 510 (e.g., ROM, flash memory, DRAM such as SDRAM or Rambus DRAM (RDRAM), etc.), a static memory 515 (e.g., flash memory, static RAM (SRAM), etc.), and a data storage system 525, which communicate with each other via a bus 545.

Processing device 505 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 505 can also be one or more special-purpose processing devices such as an ASIC, an FPGA, a DSP, network processor, or the like. The processing device 505 is configured to execute instructions 535 for performing the operations and steps discussed herein. The computer system 500 can further include a network interface device 520 to communicate over the network 540.

The data storage system 525 can include a machine-readable storage medium 530 (also known as a computer-readable medium) on which is stored one or more sets of instructions 535 or software embodying any one or more of the methodologies or functions described herein. The instructions 535 can also reside, completely or at least partially, within the main memory 510 and/or within the processing device 505 during execution thereof by the computer system 500, the main memory 510 and the processing device 505 also constituting machine-readable storage media. The machine-readable storage medium 530, data storage system 525, and/or main memory 510 can correspond to a memory sub-system.

In one example, the instructions 535 include instructions to implement functionality corresponding to a buffer manager 550 (e.g., the buffer manager 150 described with reference to FIG. 1). While the machine-readable storage medium 530 is shown as a single medium, the term "machine-readable storage medium" can include a single medium or multiple media that store the one or more sets of instructions. The term "machine-readable storage medium" can also include any medium that is capable of storing or encoding a set of instructions for execution by the machine and that cause the machine to perform any one or more of the methodologies of the present disclosure. The term "machine-readable storage medium" can include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some examples, a machine-readable (e.g., computer-readable) medium includes a machine (e.g., a computer) readable storage medium such as a ROM, RAM, magnetic disk storage media, optical storage media, flash memory components, etc.

In the foregoing specification, examples of the disclosure have been described with reference to specific example examples thereof. It will be evident that various modifications can be made thereto without departing from the broader spirit and scope of examples of the disclosure as set forth in the following claims. The specification and drawings are, accordingly, to be regarded in an illustrative sense rather than a restrictive sense.

What is claimed is:

1. A method by a memory device, comprising:
generating, by the memory device, a first set of one or more write commands associated with a set of transfer units for one or more media management operations;
identifying, from a plurality of entries, a subset of entries associated with the first set of one or more write commands;
buffering, by storing at a queue, the first set of one or more write commands using the subset of entries based at least in response to receiving, at the queue, a second set of one or more write commands from a host device; and
issuing the first set of one or more write commands based at least in part on the plurality of entries and a completion of the second set of one or more write commands.

2. The method of claim 1, further comprising:
receiving a first set of one or more read responses corresponding to a second subset of the plurality of entries; and
buffering the first set of one or more write commands based at least in part on the first set of one or more read responses, wherein each of the first set of one or more read responses corresponds to a write command of the first set of one or more write commands.

3. The method of claim 2, wherein the first set of one or more read responses are received in consecutive order with respect to a read order implicit to the plurality of entries.

4. The method of claim 2, further comprising:
issuing a first set of one or more read commands; and
receiving the first set of one or more read responses based at least in part on issuing the first set of one or more read commands.

5. The method of claim 1, further comprising:
updating a current state of operations for the subset of entries based at least in part on the first set of one or more write commands.

6. The method of claim 1, further comprising:
storing the plurality of entries in a linked list or ring buffer; and
buffering the first set of one or more write commands using the subset of entries in the linked list or ring buffer.

7. The method of claim 1, wherein the first set of one or more write commands correspond to consecutive entries of the plurality of entries.

8. A system comprising:
a plurality of memory devices; and
one or more controllers coupled with the plurality of memory devices, wherein the one or more controllers are operable to cause the system to:
generate a first set of one or more write commands associated with a set of transfer units for one or more media management operations;
identify, from a plurality of entries, a subset of entries associated with the first set of one or more write commands;
buffer, by storing at a queue, the first set of one or more write commands using the subset of entries based at least in response to receiving, at the queue, a second set of one or more write commands from a host device; and
issue the first set of one or more write commands based at least in part on the plurality of entries and a completion of the second set of one or more write commands.

9. The system of claim 8, wherein the one or more controllers are further operable to cause the system to:
store a state of operations for the plurality of memory devices as the plurality of entries in a linked list or ring buffer, wherein each entry in the linked list or ring buffer corresponds to one of the plurality of memory devices.

10. The system of claim 9, wherein the one or more controllers are further operable to cause the system to:
receive a first set of one or more read responses associated with a subset of the plurality of memory devices; and
update the state of operations for the subset of the plurality of memory devices based at least in part on the first set of one or more read responses.

11. The system of claim 10, wherein the one or more controllers are further operable to cause the system to:
issue a first set of one or more read commands; and
receive the first set of one or more read responses based at least in part on issuing the first set of one or more read commands.

12. The system of claim 8, wherein the first set of one or more write commands correspond to consecutive entries of the plurality of entries.

13. A non-transitory computer-readable storage medium comprising instructions that, when executed by one or more processors, cause the one or more processors to:
generate a first set of one or more write commands associated with a set of transfer units for one or more media management operations;
identify, from a plurality of entries, a subset of entries associated with the first set of one or more write commands;
buffer, by storing at a queue, the first set of one or more write commands using the subset of entries based at least in response to receiving, at the queue, a second set of one or more write commands from a host device; and
issue the first set of one or more write commands based at least in part on the plurality of entries and a completion of the second set of one or more write commands.

14. The non-transitory computer-readable storage medium of claim 13, wherein the one or more processors are further to:
receive a first set of one or more read responses, the first set of one or more read responses corresponding to a second subset of the plurality of entries; and
buffer the first set of one or more write commands based at least in part on the first set of one or more read responses, wherein each of the first set of one or more read responses corresponds to a write command of the first set of one or more write commands.

15. The non-transitory computer-readable storage medium of claim 14, wherein the first set of one or more read responses are received in consecutive order with respect to a read order implicit to the plurality of entries.

16. The non-transitory computer-readable storage medium of claim 14, wherein the one or more processors are further to:
issue a first set of one or more read commands; and receive the first set of one or more read responses based at least in part on issuing the first set of one or more read commands.

17. The non-transitory computer-readable storage medium of claim 13, wherein the one or more processors are further to:
update a state of operations for the subset of entries based at least in part on the first set of one or more write commands.

18. The non-transitory computer-readable storage medium of claim 13, wherein the one or more processors are further to:
store the plurality of entries in a linked list or ring buffer; and
buffer the first set of one or more write commands using the subset of entries in the linked list or ring buffer.

19. The non-transitory computer-readable storage medium of claim 13, wherein the first set of one or more write commands correspond to consecutive entries of the plurality of entries.

* * * * *